US008290006B1

(12) United States Patent
Gradl et al.

(10) Patent No.: US 8,290,006 B1
(45) Date of Patent: Oct. 16, 2012

(54) DYNAMICALLY VARIABLE SPOT SIZE LASER SYSTEM

(75) Inventors: Paul R. Gradl, Huntsville, AL (US); John F. Hurst, Upland, CA (US); James R. Middleton, Rancho Cucamonga, CA (US)

(73) Assignee: The United States of America as Represented by the Administrator of the National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 13/281,025

(22) Filed: Oct. 25, 2011

(51) Int. Cl.
*H01S 3/13* (2006.01)
*H01S 3/00* (2006.01)
*B23K 26/00* (2006.01)

(52) U.S. Cl. ............... 372/29.014; 372/29.01; 372/38.1; 372/38.03; 219/121.6

(58) Field of Classification Search ............... 372/29.01, 372/29.014, 38.1, 38.03, 38.09; 219/121.6, 219/121.63, 121.75
See application file for complete search history.

(56) References Cited

U.S. PATENT DOCUMENTS

| | | | |
|---|---|---|---|
| 3,622,743 A | 11/1971 | Muncheryan | |
| 4,564,736 A | 1/1986 | Jones et al. | |
| 4,757,515 A | 7/1988 | Hughes | |
| 4,906,812 A | 3/1990 | Nied et al. | |
| 5,563,391 A | 10/1996 | Dahm | |
| 6,774,338 B2 | 8/2004 | Baker et al. | |
| 7,012,216 B2 | 3/2006 | Baker et al. | |
| 7,038,162 B2 | 5/2006 | Baker et al. | |
| 7,094,988 B1 | 8/2006 | Taylor | |
| 7,112,761 B2 | 9/2006 | Hughes et al. | |
| 7,307,237 B2 | 12/2007 | Hughes et al. | |
| 7,550,693 B2 | 6/2009 | Hughes et al. | |
| 7,612,312 B2 | 11/2009 | Baker et al. | |
| 7,772,520 B2 | 8/2010 | Bushroe et al. | |
| 2004/0016726 A1 | 1/2004 | Renteria et al. | |
| 2007/0023403 A1 | 2/2007 | Emiljanow | |
| 2007/0138150 A1 | 6/2007 | Gualtieri | |

FOREIGN PATENT DOCUMENTS

| | | |
|---|---|---|
| DE | 19817629 A1 | 10/1999 |
| EP | 1475219 A2 | 11/2004 |
| JP | 2235591 A | 9/1990 |
| JP | 2001300722 A | 10/2001 |
| JP | 2005334914 A | 12/2005 |
| WO | 2005053897 A1 | 6/2005 |

*Primary Examiner* — Armando Rodriguez
(74) *Attorney, Agent, or Firm* — Absolute Technology Law Group, LLC

(57) ABSTRACT

A Dynamically Variable Spot Size (DVSS) laser system for bonding metal components includes an elongated housing containing a light entry aperture coupled to a laser beam transmission cable and a light exit aperture. A plurality of lenses contained within the housing focus a laser beam from the light entry aperture through the light exit aperture. The lenses may be dynamically adjusted to vary the spot size of the laser. A plurality of interoperable safety devices, including a manually depressible interlock switch, an internal proximity sensor, a remotely operated potentiometer, a remotely activated toggle and a power supply interlock, prevent activation of the laser and DVSS laser system if each safety device does not provide a closed circuit. The remotely operated potentiometer also provides continuous variability in laser energy output.

25 Claims, 6 Drawing Sheets

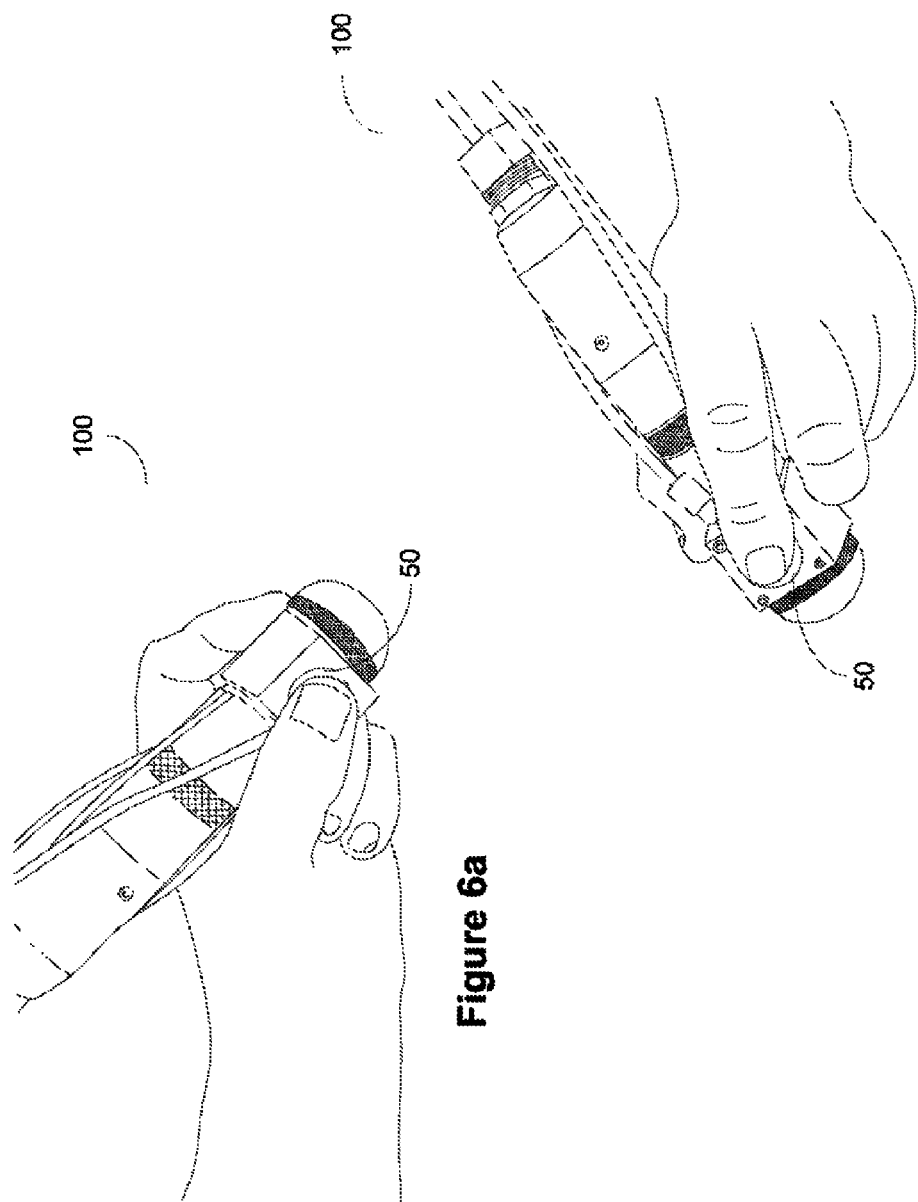

DYNAMICALLY VARIABLE SPOT SIZE LASER SYSTEM

FEDERAL RESEARCH STATEMENT

The invention described herein was made in the performance of work under a NASA contract and by an employee of the United States Government and is subject to the provisions of Section 305 of the National Aeronautics and Space Act of 1958, as amended, Public Law 85-568 (72 Stat. 435, 42 U.S.C. §2457), and may be manufactured and used by or for the Government for governmental purposes without the payment of any royalties thereon or therefore.

CROSS-REFERENCES TO RELATED APPLICATIONS

None.

FIELD OF INVENTION

The present invention relates to the field of welding and brazing, and more particularly to a dynamically variable spot size laser system for bonding metal components.

TERMS OF ART

As used herein, the term "cover lens" means a transmissive window to protect the inner parts and optics from environmental contamination.

As used herein, the term "fiber" is a glass structure measured in microns which carries laser energy within a fiber optic cable.

As used herein, the term "fiber laser power supply" refers to a power supply which uses an optical fiber doped with rare-earth elements to increase its output. Rare earth elements include, but are not limited to, erbium, ytterbium, neodymium, dysprosium, praseodymium and thulium.

As used herein, the term "focal lens" or "zoom lens" means a transmissive lens that converges a beam to a specified area/diameter.

As used herein, the term "gas coverage assembly" refers to a device or assembly internal to a dynamically variable spot size laser torch that allows for even distribution of a shielding gas to prevent contamination of the weld area. A gas coverage assembly may include, but is not limited to, an annual chamber, orifice, diffusion screens, and nozzle assembly.

As used herein, the term "gas diffusion screen" refers to any thinly-woven screen or mesh-like structure that allows gas to distribute over a working area.

As used herein, the term "guide beam" refers to a secondary low power laser device that provides a visual indication of a primary laser's path within the same optical path as the primary welding laser. A guide beam is typically used prior to welding or brazing to position a torch.

As used herein, the term "interlock switch" refers to any structural component (e.g., a lever, sensor, button, door, touch pad, code, or voice command) used to shut off power and/or control access prior to a laser becoming operational.

As used herein, the term "laser beam" refers to light emitted by a laser device.

As used herein, the term "lens position structural component" refers to any structure or device used to alter the position of at least one lens, including, but not limited to, external pin systems, external rod systems, internal cam systems and combinations thereof.

As used herein, the term "operatively coupled" means permanently or temporarily in physical or electrical communication so that a component functions in a complementary or consistent manner with another component.

As used herein, the term "optically aligned" means positioned along one common axis to a high degree of accuracy. For example, lenses optically aligned with a laser create essentially no pan or tilt of the laser beam that would cause substantial internal heating of a dynamically variable spot size laser torch; the laser beam is concentric with the internal optics.

As used herein, the term "proximity sensor" means a device that will detect the distance from a torch to a part surface to activate the torch. For example, a torch may need to be within a set distance for lasing to begin.

As used herein, the term "selectively adjustable" means capable of being moved, altered, or otherwise adjusted as needed. Components of a hand-held laser torch or system may be selectively adjustable in real time. Components may also be continuously selectively adjustable or selectively adjustable in predetermined increments. Components which are selectively adjustable may also be removable and replaceable.

As used herein, the term "selectively positional" means able to be attached, moved or otherwise positioned as needed. Components of a hand-held laser torch or system may be selectively positionable in real time. Components may be selectively positionable in order to increase comfort and safety when performing joining operations.

As used herein, the term "variable spot size" refers to a focused area at a set distance from the end of a torch, generally the area (diameter) to which power is to be delivered, which may be varied in real time by mechanically or manually adjusting internal lens configuration.

As used herein, the term "zoom lens assembly" means a series of lenses that vary magnification (e.g., the relation of the fiber optic cable to the spot size).

BACKGROUND OF THE INVENTION

Welding and brazing are processes used to join metallic materials by applying heat to create a structural bond at the interface of the two materials.

Brazing is a lower-temperature process where two materials are joined using a third "filler" material. Because the filler bonds at lower temperatures, brazing is generally used for more heat sensitive, thin-wall components.

Metal bonding temperatures can cause damage to sensitive components. This is particularly true of small, sensitive thin-walled structures that may have a thickness of only thousandths of an inch.

Examples of metal bonding processes known in the aerospace industry include Gas Tungsten Arc Welding (GTAW), Micro Plasma Transfer Arc (MPTA), hydrogen torch, and gas metal arc welding (GMAW). However, the heat generated by these bonding processes has damaged components, and the space necessary for safe operation of these processes is not conducive to making repairs in tight or confined areas.

Lasers are the most accurate means to accomplish sensitive welding and brazing operations on small, thin walled components while minimizing heat damage. Lasers accomplish precise, area controlled heating over a reduced "spot size." "Spot size" refers to a focused area set at a distance from the end of the laser beam that approximates the area (diameter) to which power is to be delivered. A "heat affected zone" is the actual area affected by the application of heat during a metal bonding process.

However, the use of lasers is extremely dangerous, even lethal, thus limiting the settings in which they can be used. Most laser systems known in the art, therefore, are completely enclosed systems primarily restricted to automated robotic operations. Completely enclosed and pre-programmed laser systems are impractical for unique manual repairs on sensitive components used in the aerospace industry.

Completely enclosed and pre-programmed laser systems are impractical for repairs on sensitive components, and it is often desirable to vary the amount of output power to accommodate specific areas of a work piece which may be more sensitive than other areas. Hand-held laser systems, such as those disclosed in U.S. Pat. Nos. 7,012,216 and 4,564,736 made by Honeywell Corporation and General Electric Corporation, respectively, have been developed to provide lasing systems with more output control. However, lasers, although highly effective, are not used in many settings because contact with a misdirected laser is critically dangerous for humans and can destroy objects and components.

For example, NASA has only recently sanctioned the use of lasers in very controlled and restricted settings. NASA had made a determination that the accuracy and benefits of laser welding are not worth the risk of misdirected lasers, even when the lasers were operated by the most highly trained operators. Features such as proximity sensors are known in the art. However, these safety features are only effective if they can be rapidly and efficiently deployed by a user.

There is an unmet need for safety features that enable safe laser welding in an increased number of settings and particularly in confined spaces.

There is a further unmet need for usable bonding technologies which can minimize heat damage to sensitive components, particularly sensitive and thin-walled components used in aerospace technologies.

There is a further unmet need for a hand-held lasing device that allows a user to flexibly redirect the angle of a laser relative to spot size in real time.

There is also an unmet for a handheld laser device which can be used in confined spaces.

SUMMARY OF THE INVENTION

The present invention is a Dynamically Variable Spot Size (DVSS) laser system for bonding metal components. The DVSS laser system includes an elongated housing containing a light entry aperture coupled to a laser beam transmission cable and a light exit aperture. A plurality of lenses contained within the housing focus a laser beam from the light entry aperture through the light exit aperture. The lenses may be dynamically adjusted to vary the spot size of the laser.

A plurality of interoperable safety devices, including a manually depressible interlock switch, an internal proximity sensor, a remotely operated potentiometer, a remotely activated toggle and a power supply interlock, prevent activation of the laser and DVSS laser system if each safety device does not provide a closed circuit. The remotely operated potentiometer also provides continuous variability in laser power output.

BRIEF DESCRIPTION OF THE DRAWINGS

FIG. 6*a* illustrates an exemplary of a DVSS laser system being used with the thumb depressing the interlock button.

FIG. 6*b* illustrates an exemplary of a DVSS laser system being used with the index finger depressing the interlock button.

DETAILED DESCRIPTION

Figure 1:
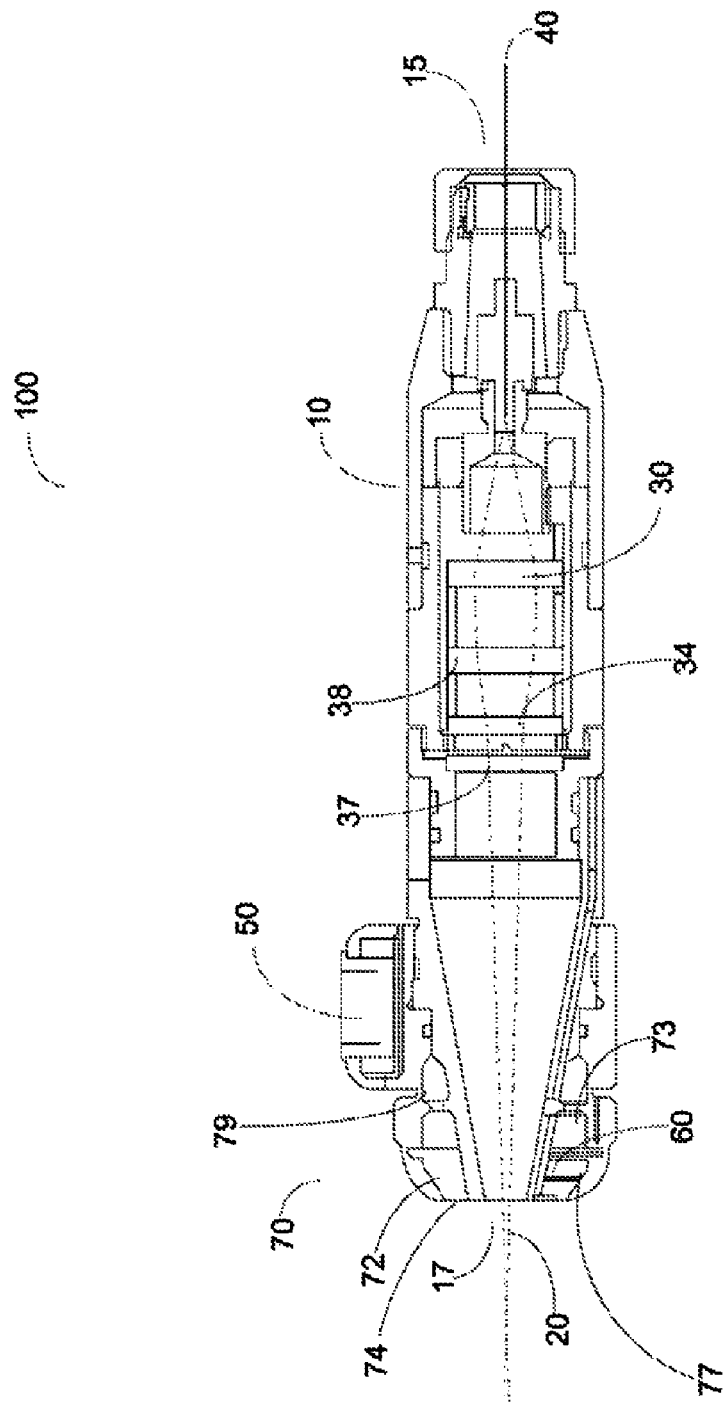
FIG. 1 illustrates an exemplary embodiment of a Dynamically Variable Spot Size (DVSS) laser system.

For the purpose of promoting an understanding of the present invention, references are made in the text to exemplary embodiments of a dynamically variable spot size laser torch and joining system, only some of which are described herein. It should be understood that no limitations on the scope of the invention are intended by describing these exemplary embodiments. One of ordinary skill in the art will readily appreciate that alternate but functionally equivalent materials, components, and designs may be used. The inclusion of additional elements may be deemed readily apparent and obvious to one of ordinary skill in the art. Specific elements disclosed herein are not to be interpreted as limiting, but rather as a basis for the claims and as a representative basis for teaching one of ordinary skill in the art to employ the present invention.

It should be understood that the drawings are not necessarily to scale; instead, emphasis has been placed upon illustrating the principles of the invention. In addition, in the embodiments depicted herein, like reference numerals in the various drawings refer to identical or near identical structural elements.

Moreover, the terms "substantially" or "approximately" as used herein may be applied to modify any quantitative representation that could permissibly vary without resulting in a change in the basic function to which it is related.

FIG. 1 is an exemplary embodiment of Dynamically Variable Spot Size laser system 100. In the embodiment shown, Dynamically Variable Spot Size (DVSS) laser system 100 has housing 10 which is cylindrically shaped having a diameter of less than 2 inches to accommodate a user's grasp, but which is also large enough to accommodate the internal components of dynamically variable spot size laser torch.

As illustrated in the exemplary embodiment shown in FIG. 1, housing 10 is also compactly designed to allow operators to safely use DVSS laser system 100 in confined areas. In further exemplary embodiments, housing 10 may be weighted or differently shaped to enable operators to perform specific repair tasks. For example, in some exemplary embodiments, housing 10 may be slightly bent.

In the exemplary embodiment shown, housing 10 is constructed of aluminum or other light weight, heat resistant metal, alloys, resins or composite materials. The material of housing 10 is selected to minimize the mass and thickness of housing 10.

Shown on the exterior of housing 10 is manually depressible interlock switch 50, the first of three safety activation switches used with DVSS laser system 100. In the exemplary embodiment shown, interlock switch 50 is a circuit (dead man's) switch which includes a flat, pressure surface large enough for a user to find and depress by tactilely, rather than visually, locating it. At rest, interlock switch 50 is in the off position. In order to activate DVSS laser system 100, interlock switch 50 must be depressed and continued to be depressed during operation. DVSS laser system 100 will turn off when interlock switch 50 is released.

As illustrated in FIG. 1, manually depressible interlock switch 50 is located near the laser-emitting end of DVSS laser system 100 where a user would commonly be holding DVSS laser system 100. In further exemplary embodiments, interlock switch 50 may be differently located or arranged to accommodate left- or right-handedness or may be included higher up on housing 10. In still further exemplary embodiments, interlock switch 50 may be moveable so that it can be positioned where it feels most comfortable for the operator.

In the exemplary embodiment shown, housing 10 substantially encloses the internal components of DVSS laser system 100 and contains light entry aperture 15 and light exit aperture 17. Laser beam 20 is generated by an external power source (not shown) and transmitted to DVSS laser system 100 using fiber optic cable 40, which enters DVSS laser system 100 at light entry aperture 15.

As illustrated in the exemplary embodiment shown in FIG. 1, light entry aperture 15 and exit aperture 17 are have a diameter of approximately 0.250 inches. However, the diameter of light entry aperture 15 may dependently vary on the size of fiber optic cable 40 transmitting laser beam 20.

Laser beam 20 is focused by a plurality of linearly arranged lenses. In the exemplary embodiment shown in FIG. 1, laser beam 20 is first received by collimating lens 30 and then transmitted to focal lens 34 and cover lens 37 to narrow and focus laser beam 20. In the exemplary embodiment shown, DVSS laser system 100 also contains additional zoom lens assembly 38 between collimating lens 30 and focal lens 34 to provide more control over the spot size. Other embodiments may omit additional zoom lens assembly 38.

In the exemplary embodiment shown, zoom lens assembly 38 contains two bi-convex lenses and a single meniscus lens. In other exemplary embodiments, such as when brazing, a fourth concave lens may be added to zoom lens assembly 38.

In the exemplary embodiment shown, the lenses 30, 34, 37 and 38 have a diameter of approximately 0.375 inches, and housing 10 has an external diameter of 0.7 inches to accommodate the internally housed lens configuration comprised of lenses 30, 34, 37 and 38. In further exemplary embodiments, lenses 30, 34, 37 and 38 may have larger or smaller diameter, and the diameters of lenses 30, 34, 37 and 38 may be inconsistent. For example, brazing requires a larger spot size while welding uses a smaller spot size for more power density. The internal diameter of housing 10 may be varied to accommodate lenses 30, 34, 37 and 38.

In the exemplary embodiment shown in FIG. 1, lenses 30, 34, 37 and 38 focus laser beam 20 at a distance of 0.5 inches from light exit aperture 17. In further exemplary embodiments, lenses 30, 34, 37 and 38 may be adjusted to focus laser beam 20 at different distances.

In the exemplary embodiment shown, each lens 30, 34, 37 and 38 may be adjustable or replaceable to provide continuously variable spot size. In some exemplary embodiments, two separate DVSS laser systems may be provided, one for brazing applications and one for welding applications. A brazing torch would include adjustable lenses to create a larger spot size with continuous variability to an area ratio of 9:1. A welding torch would include adjustable lenses to create a smaller spot size to more precisely focus the energy of the laser with continuous variability to an area ratio of 11:1.

In the exemplary embodiment shown, lenses 30, 34, 37 and 38 are made from coated fused silica in order to withstand the high temperatures generated.

As illustrated in FIG. 1, the lens system of DVSS laser system 100 is designed so that the optimal brazing distance from the end of DVSS laser system 100 is in a de-focused area of the lens. This allows for a larger spot size for heating the joining area and accommodates varying sizes of filler metal which may be used. In some exemplary embodiments, the optimal working distance, such as that for welding, may be in a focused area for zoom lens assembly 38.

The ability to flexibly change the spot size of laser beam 20 is critical to allow a user to appropriately tailor spot sizes depending on the operation being performed. Variability in spot sizes also accommodates varying sizes of filler metal to be used during brazing processes.

The ability to repair or replace lenses 30, 34, 37, and 38 is also critical to providing continuous variability in spot size. Damaged or dirty lenses may be quickly and easily replaced. In the exemplary embodiment shown, lenses 30, 34, 37 and 38 may be removed without specialized tools, allowing lenses 30, 34, 37 and 38 to be adjusted, repaired or replaced at the work site.

As illustrated in FIG. 1, lenses 30, 34, 37 and 38 are adjusted together using lens position structural components, which, in the exemplary embodiment shown, is an external pin/rod system. In further exemplary embodiments, screws or an internal movable cam system may be used to adjust lenses 30, 34, 37 and 38. A movable cam system or external pin/rod system allows an operator to control focusing in real time during the joining process.

Adjusting lenses allows a user to determine the spot size. Spot size is decided based on the power density required. Spot sizes may range from 0.002 inches to 0.075 inches.

In some exemplary embodiments, DVSS laser system 100 may include a mirror or system of mirrors which would direct laser beam 20 and allow DVSS laser system 100 to be positioned at various angles. This would provide a greater flexibility in the areas on which DVSS laser system 100 may be positioned to perform joining operations. For example, a mirror may be provided at a 45 degree angle to position laser beam 20 at a desired work location. However, a mirror may be positioned at any angle required.

Internal proximity sensor 60 is the second safety activation switch. Internal proximity sensor 60 is exposed at light exit aperture 17 and determines the distance from light exit aperture 17 to a surface. If the distance is greater than a predetermined distance, DVSS laser system 100 will not power on, even if interlock switch 50 is depressed. Once light exit aperture 17 is within the predetermined distance, internal proximity sensor 60 will allow DVSS laser system 100 to be activated, if the other safety activation switches allow. DVSS laser system 100 will again deactivate if moved outside of the allowable distance.

In the exemplary embodiment shown in FIG. 1, DVSS laser system 100 contains a single internal proximity sensor 60. In further exemplary embodiments, DVSS laser system 100 may contain additional internal proximity sensors.

As illustrated in FIG. 1, DVSS laser system 100 also contains integral inert gas coverage system 70. Gas flow rates are controlled by the external control unit (not shown) and activated once the foot toggle switch (not shown), the third safety activation switch, is depressed and continues for a duration of 30 seconds following the return of the toggle switch to the off position. In further exemplary embodiments, ECU may be configured to provide gas flow for varying durations.

Integral inert gas coverage system 70 contains finalized gas cone 72 with gas fitting 74 to provide flow through the center of DVSS laser system 100. Integral inert gas coverage system 70 also contains diffusion screens 77 which properly distribute gas flow on the work piece without compromising any of the laser energy emitted from the torch. Integral inert gas coverage system 70 reduces the possibility of contamination and provides a locally controlled environment for the joining process.

Integral inert gas coverage system 70 also contains annular chamber 79 with gas orifice ring 73. Annular chamber 79 may also be referred to as a "gas chamber" or "gas filled annulus." Gas enters annular chamber 79 tangentially and delivered through finalized gas cone 72.

As illustrated in FIG. 1, integral inert gas coverage system 70 is integral to DVSS laser system 100, and gas is released in the same path as laser beam 20. Integral inert gas coverage system includes annular chamber 79, orifice ring 73, diffusion screens 77 and gas cone 72. Integral inert gas coverage system distributes the shielding gas in the small area being brazed or welded to prevent contamination, such as oxidation, which can lead to cracking or impurities. Integral inert gas coverage system 70 allows the gas flow to be controlled and specifically aimed to prevent a small area from becoming flooded with the gas, which could be dangerous in a confined space.

In the exemplary embodiment shown, diffusion screens 77 are replaceable. In further exemplary embodiments, diffusion screens 77 may be positionable to allow for changes in the inert gas field as a job requires.

Integral inert gas coverage system 70 may also be used with customized or off-the-shelf gas lenses, similar to those used with a GTAW torch. Flexibility in gas lenses allows for varying gas coverage for working with a variety of metals.

Figure 2:
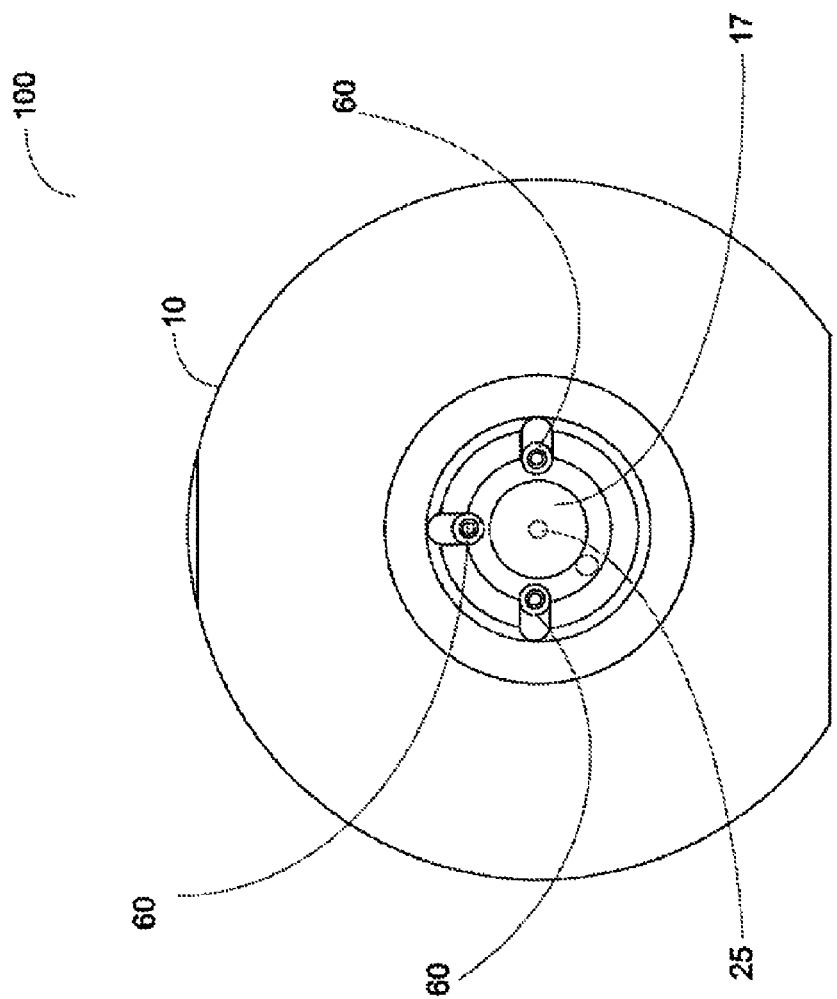
FIG. 2 is an exemplary embodiment of a DVSS laser system showing a proximity sensor.

FIG. 2 illustrates light exit aperture 17 of an exemplary embodiment of DVSS laser system 100. In the exemplary embodiment shown, DVSS laser system 100 contains three internal proximity sensors 60 located around light exit aperture 17. As illustrated, internal proximity sensors 60 are on only half of the circumference of light exit aperture 17. However, in other exemplary embodiments, internal proximity sensors 60 may be more clustered or symmetrically arranged around light exit aperture 17. In further exemplary embodiments, a single internal proximity sensor may be used.

Integral diode guide beam 25 is also shown in FIG. 2 aligned with the optical path of laser beam 20 (not shown). In the exemplary embodiments shown, laser beam 20 (not shown) created by the power supply (not shown) is an invisible beam. To aid a user in determining where laser beam 20 (not shown) is in relation to the material being joined, housing 10 contains integral diode guide beam 25 which is integrated into the optical path of laser beam 20 (not shown). In some exemplary embodiments, integral diode guide beam 25 may be configured to be on at all times. In further exemplary embodiments, integral diode guide beam 25 may be configured to turn on when any safety activation switches is triggered.

In the exemplary embodiment illustrated in FIG. 2, internal proximity sensors 60 are attenuated sensors and integral diode guide beam 25 provides the feedback to the system. Guide beam 25 produces the signal detected by internal proximity sensors 60 to detect the difference between different surfaces and materials, such as ferrous metals, nonferrous metals, superalloys and skin. DVSS laser system 100 may therefore be programmed to not activate if proximity sensors detect skin.

Figure 3:
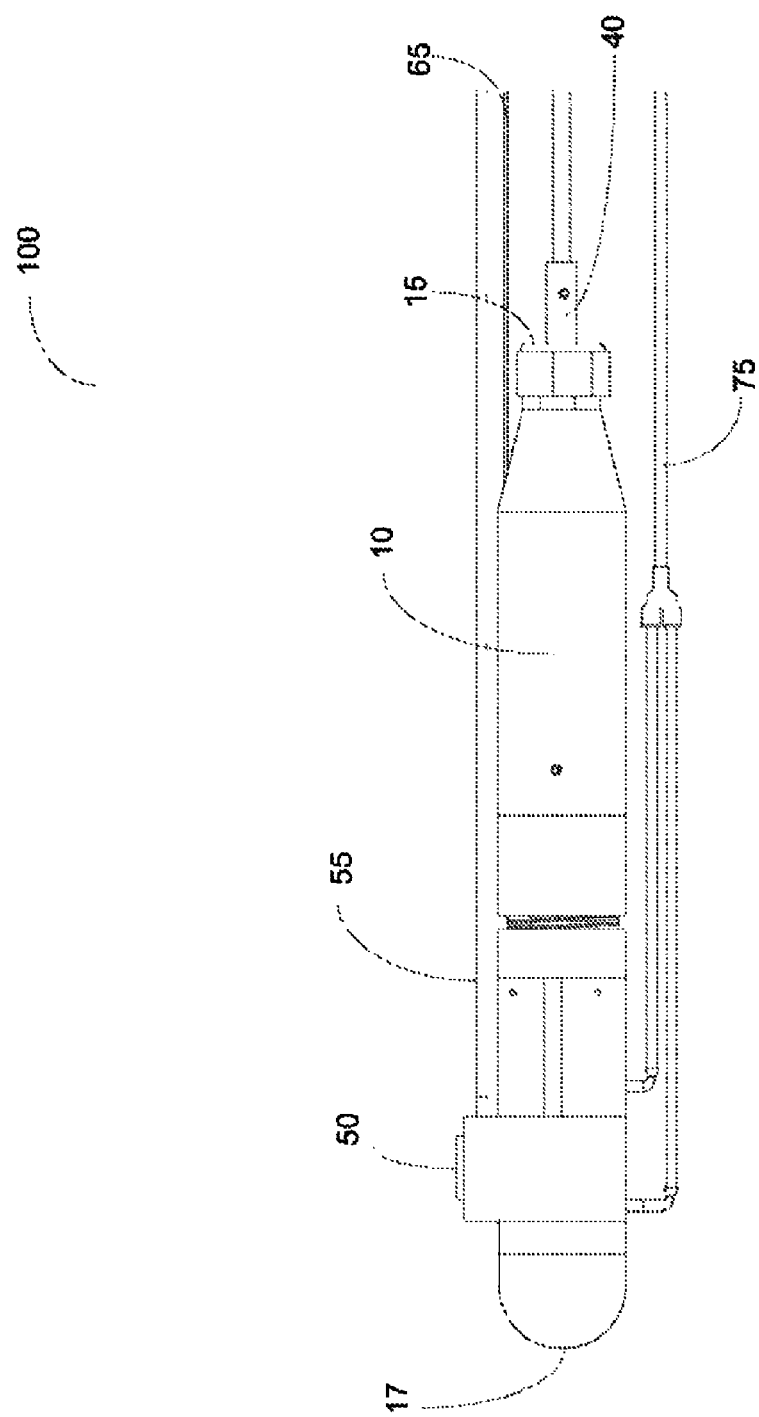
FIG. 3 is an external view of an exemplary embodiment of a DVSS laser system.

FIG. 3 is an external view of an exemplary DVSS laser system 100. Fiber optic cable 40 enters DVSS laser system 100 at light entry aperture 15, and joins variable spot size laser torch to power supply (not shown). Interlock switch 50 is located near the laser-emitting end of variable spot size laser torch 100, but a sufficient distance away from light exit aperture 17. Interlock switch wiring 55 runs from manually depressible interlock switch 50 to an external control unit (not shown).

As illustrated in FIG. 3, interlock switch 50 is approximately 1.5 inches from light exit aperture 17 and movable radially around the center axis of housing 10 within a range of 180 degrees. Axial movement along housing 10 is limited, but the position of interlock switch 50 may be axially adjusted within a range of 0.5 inches.

Proximity fiber 65 connects internal proximity sensor 60 (not shown) to the external control unit (not shown) which prevents activation of DVSS laser system 100 if all safety activation switches are not appropriately triggered.

Gas input 75 is also shown in FIG. 3 and provides gas to integral inert gas distribution system 70 (not shown).

Figure 4:
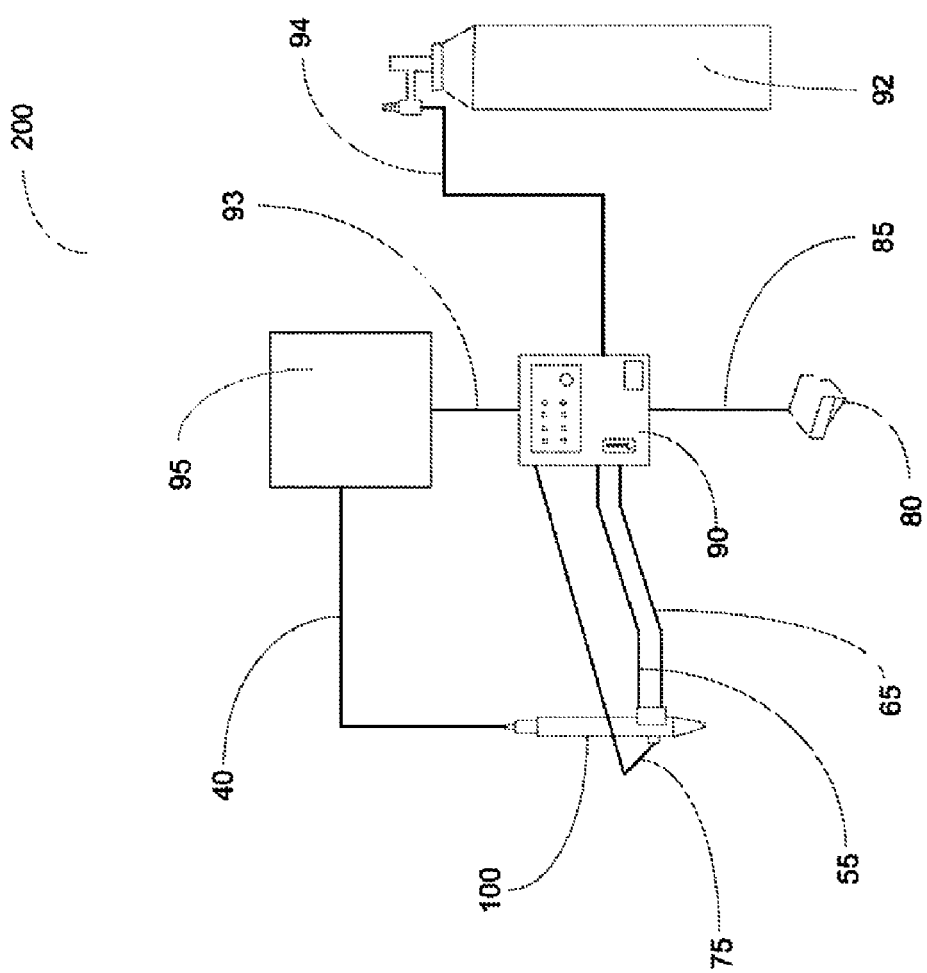
FIG. 4 is an exemplary embodiment of a DVSS laser system showing external control unit.

FIG. 4 is an exemplary embodiment of joining system 200 using DVSS laser system 100. DVSS laser system 100 is connected to external control unit (ECU) 90 by interlock switch wiring 55, proximity fiber 65 and gas input 75. ECU 90 is connected to gas supply 92 through gas connection 94 and power supply 95 through power supply cable 93. Power supply 95 generates laser beam 20 (not shown), which is transmitted to hand-held laser torch 100 by fiber optic cable 40.

Also shown in the exemplary embodiment illustrated in FIG. 4 is the third safety activation switch, remotely activated potentiometer 80, connected to ECU 90 by toggle wire 85. In the exemplary embodiment shown, remotely activated potentiometer 80 is a foot pedal. In its default position, without pressure applied to remotely activated potentiometer 80, remotely activated potentiometer 80 is off and DVSS laser system 100 will not activate. When remotely activated potentiometer 80 is depressed, DVSS laser system 100 is able to be activated, providing the remaining safety activation switches are appropriately triggered.

In the exemplary embodiment shown, remotely activated potentiometer 80 is a foot pedal which provides familiarity to existing joining systems known in the art, such as the GTAW welding system. However, in further exemplary embodiments, remotely activated potentiometer 80 may be a structure on DVSS laser system 100 or ECU 90. In still further exemplary embodiments, remotely activated potentiometer 80 may be vertically mounted or mounted on an undersurface of a material being worked on. In such exemplary embodiments, remotely activated potentiometer 80 may be activated with a user's knee, ankle or other body part.

Remotely activated potentiometer 80 also acts to variably control the laser power output, giving an operator direct control of the output intensity. Many repairs or other operations require an operator to vary the heat input as the operation is taking place. In other exemplary embodiments, remotely activated potentiometer 80 may be any structure which allows a user to vary the output of DVSS laser system 100.

In some exemplary embodiments, remotely activated potentiometer 80 may also contain a remote deactivation switch which allows a secondary operator to de-activate DVSS laser system 100 if necessary. For example, a remote deactivation switch may be located on ECU 90 or other component accessible by a secondary operator. Remote activation of remotely activated potentiometer 80, however, will not energize DVSS laser system 100.

In the exemplary embodiment shown in FIG. 4, the single ECU 90 allows an operator to control the multiple variables of joining system 200, such as power and gas flow rate, instead of the controls located on the individual components of joining system 200, such as power supply 95 and gas supply 92. In some exemplary embodiments, ECU 90 may also contain an activation switch or power supply interlock switch which allows an operator to power on joining system 200 without interacting directly with power supply 95.

In the exemplary embodiment shown, variable spot size laser torch 100 is designed to work with existing off-the-shelf power supplies. The power supply 95 illustrated in the exemplary embodiment in FIG. 4 is a fiber laser 300W maximum output power supply known in the art, such as the Nd:YAG (neodymium doped yttrium aluminum garnet) power supply manufactured by Miyachi-Unitek.

In some exemplary embodiments, power supply 95 may be a fiber laser which allows for various modes of operation, such as pulsed, continuous or quasi-continuous modes and a variety of wave forms (i.e., square, sine, saw).

Power supply 95 in the exemplary embodiment shown uses a 3-phase 220 V, 50 A minimum electricity input and supplies a low pulsed laser beam through fiber optic cable 40. In the exemplary embodiment shown, fiber optic cable 40 is housed in a protective plastic and metal sheath.

In further exemplary embodiments, DVSS laser system 100 may be configured for use with a specifically designed power supply or any other power supply known in the art to supply the power needed to generate laser beam 20 (not shown).

As illustrated in FIG. 4, ECU 90 incorporates all controls necessary to perform brazing or welding with off-the-shelf power supply 95. ECU 90 provides power to interlock switch 50, internal proximity sensor 60 and remotely activated potentiometer 80 and switches control of DVSS laser system 100 from power source 95 to remotely activated potentiometer 80. ECU 90 also regulates the flow rate of the shielding gas, provided by gas supply 92 and provides an emergency stop close to where DVSS laser system 100 is being used.

As illustrated in FIG. 4, joining system 200 is approximately the size of a desktop computer, with fiber optics cable 40 available in extended sizes to allow joining operations to be performed in an open or field environment.

Figure 5:
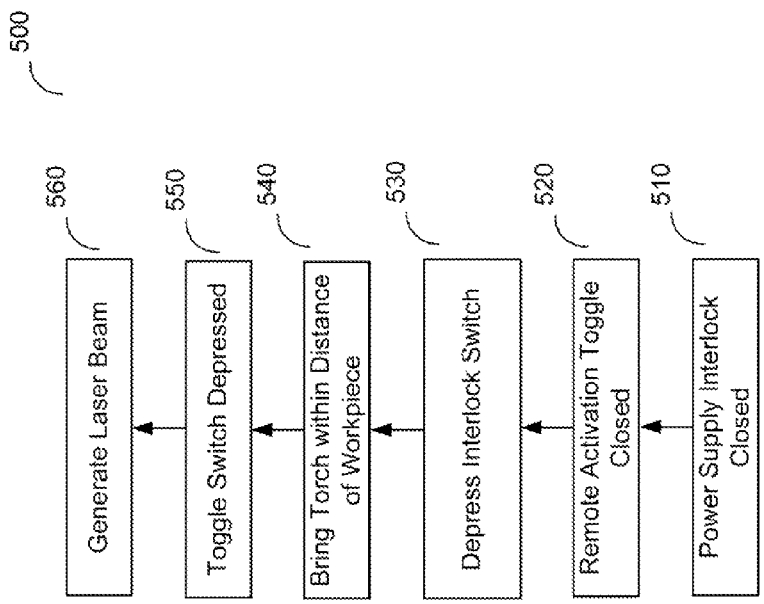
FIG. 5 is an flowchart illustrating the exemplary safety logic of a DVSS laser system in order for the device to operate

FIG. 5 is a flowchart illustrating the exemplary safety logic of an DVSS laser system and system in order for the torch to operate.

First, in Step 510, the power supply interlocks must be in the closed, or on, position, with the emergency shutdown switch in the open, or off, position. The remote activation control for the toggle switch must also be in the closed position (Step 520).

In Step 530, an operator must then physically hold the variable spot size laser torch and depress the interlock switch, closing the circuit. Once the torch is brought within the allowable distance from the surface of the work piece, the proximity sensor indicates the work piece's presence (Step 540).

The remotely operated potentiometer must also have some voltage applied to be in the closed position (Step 550). Once each safety condition is met, in Step 560, the power supply will activate and generate a laser beam.

If any of the closed switches return to an open position, or any of the open switches changed to a closed position, the system will deactivate and the power supply will cease generating the laser beam. No laser beam will be generated unless all safety devices create closed circuits.

FIGS. 6a and 6b illustrate an exemplary embodiment of DVSS laser system 100 which is structurally for adapted for hand-held use in confined spaces, and which is further adapted to be securely grasped and to deliver heat to a specific work area by varying the grasping angle. In the embodiments shown, a user manually varies the angle of delivery by quickly changing their grasp.

In FIG. 6a shows DVSS laser system 100 being used to deliver a laser beam toward an object toward the front of DVSS laser system 100. In this illustration, the user is grasping DVSS laser system 100 in a manner which allows the user to depress interlock switch 50 with a thumb. Since DVSS laser system 100 can be rotated 180 degrees within user's grasp, it can be adapted for right or left hand use.

In FIG. 6b shows DVSS laser system 100 being used to deliver a laser beam toward an object toward the side DVSS laser system 100. DVSS laser system 100 is rotated to direct the laser beam to an entirely different angle beneath DVSS laser system 100. In this illustration, the user is grasping the device in a manner which allows the user to depress interlock switch 50 with a forefinger.

The angle of delivery is determined by a user's line of vision, the position of the object being repaired and the grasping preferences of an individual user to provide maximum control.

What is claimed is:

1. An dynamically variable spot size laser apparatus comprised of:
   an elongated housing having a light entry aperture and a light exit aperture;
   a laser beam transmission cable secured to said light entry aperture;
   a plurality of linearly arranged lenses contained within said housing and in optical alignment with a laser beam to focus said laser beam through said light exit aperture;
   a guide beam within the optical path of said laser beam;
   a gas coverage assembly comprising
      a gas cone containing a gas fitting,
      at least one gas diffusion screen,
      an orifice ring, and
      an annular chamber;
   at least one proximity sensor positioned adjacent said light exit aperture and inside said housing; and
   an interlock switch on the outer surface of said housing.

2. The apparatus of claim 1 wherein said light entry aperture and said light exit aperture have a diameter of 0.250 inches.

3. The apparatus of claim 1 wherein said at least one interlock switch is a manually depressible switch.

4. The apparatus of claim 1 wherein said plurality of lenses includes a zoom lens assembly.

5. The apparatus of claim 4 wherein said zoom lens assembly includes two bi-convex lenses and a meniscus lens.

6. The apparatus of claim 4 wherein said zoom lens assembly includes a concave lens.

7. The apparatus of claim 1 wherein said plurality of lenses includes at least one collimating lens wherein the diameter of said collimating lens is 0.375 inches.

8. The apparatus of claim 1 wherein said plurality of lenses includes at least one focal lens.

9. The apparatus of claim 1 wherein said plurality of lenses includes at least one cover lens.

10. The apparatus of claim 1 which further includes at least one lens position structural component to dynamically vary spot size within a range of 0.002 to 0.075 inches.

11. The apparatus of claim 1 which further includes at least one lens position structural component is selected from the group consisting of an external pin system, an external rod system, an internal cam system and combinations thereof.

12. The apparatus of claim 1 which further includes at least one mirror optically aligned with said laser beam.

13. The apparatus of claim 12 wherein said at least one mirror is aligned at a 45 degree angle.

14. The apparatus of claim 1 wherein said at least one proximity sensor is an attenuated sensor and said guide beam provides feedback from said proximity sensor to detect one or more material characteristics.

15. The apparatus of claim 14 wherein said at least one proximity sensor is configured to detect the difference between materials selected from the group consisting of ferrous metals, nonferrous metals, superalloys, skin and combinations thereof.

16. The apparatus of claim 1 wherein said at least one gas diffusion screen is selectively removable.

17. The apparatus of claim 1 wherein said interlock switch is radially movable around the center axis of said housing with a range of 180 degree movement.

18. The apparatus of claim 1 which further includes a remotely operated potentiometer.

19. The apparatus of claim 18 wherein said interlock switch, said at least one proximity sensor and said remotely operated potentiometer are operatively connected to prevent activation of said dynamically variable spot size laser apparatus when said interlock switch, said at least one proximity sensor and said remotely operated potentiometer do not each create a closed circuit.

20. A dynamically variable spot size laser system comprised of:
   a laser apparatus comprising
      an elongated housing having a light entry aperture and a light exit aperture;
      a laser beam transmission cable;
      a plurality of linearly arranged lenses contained within said housing and in optical alignment with a laser beam to focus said laser beam through said exit aperture;
      a guide beam within the optical path of said laser beam;
      a gas coverage assembly comprising
         a gas cone containing a gas fitting,
         at least one gas diffusion screen,
         an orifice ring, and
         an annular chamber;
      at least one proximity sensor positioned on said housing; and
      a first interlock switch on the outer surface of said housing;
   a laser-generating power supply operatively coupled to said fiber optic cable and containing second interlock switch which prevents activation of said laser-generating power supply when creating an open circuit;
   a gas supply connected to said laser apparatus; and
   a remotely operated potentiometer;
   wherein an external control unit is operatively coupled to said first interlock switch, said proximity sensor and said potentiometer to prevent activation of said laser-generating power supply without each of said first interlock switch, said proximity sensor and said potentiometer creating a closed circuit.

21. The system of claim 20 wherein said external control unit contains a remotely activated toggle which creates a closed circuit to activate said laser-generating power supply.

22. The system of claim 20 wherein said potentiometer is a foot pedal.

23. The system of claim 20 wherein said potentiometer is operatively coupled with said external control unit to control said power source's output intensity.

24. The system of claim 20 wherein said power supply is a neodymium doped yttrium aluminum garnet power supply.

25. The system of claim 20 wherein said power supply is a fiber laser power supply.

* * * * *